(12) United States Patent
Grey et al.

(10) Patent No.: US 7,191,361 B2
(45) Date of Patent: Mar. 13, 2007

(54) SYSTEM AND METHOD ENABLING ASYNCHRONOUS EXECUTION OF A TEST EXECUTIVE SUBSEQUENCE

(75) Inventors: James Grey, Cedar Park, TX (US); Douglas Melamed, Pflugerville, TX (US)

(73) Assignee: National Instruments Corporation, Austin, TX (US)

( * ) Notice: Subject to any disclaimer, the term of this patent is extended or adjusted under 35 U.S.C. 154(b) by 1330 days.

(21) Appl. No.: 09/944,521

(22) Filed: Aug. 31, 2001

(65) Prior Publication Data

US 2003/0046016 A1    Mar. 6, 2003

(51) Int. Cl.
*G06F 11/00*    (2006.01)

(52) U.S. Cl. .............. 714/25; 714/48; 714/33; 718/107; 718/106; 702/119; 702/123

(58) Field of Classification Search .......... 714/33, 714/35, 36, 38, 738, 742, 25, 48, 32; 718/100, 718/102, 106, 107; 702/118, 119, 120, 123
See application file for complete search history.

(56) References Cited

U.S. PATENT DOCUMENTS

| | | | | |
|---|---|---|---|---|
| 4,622,669 | A | * | 11/1986 | Pri-Tal ................... 714/43 |
| 5,233,611 | A | * | 8/1993 | Triantafyllos et al. ........ 714/46 |
| 5,261,097 | A | | 11/1993 | Saxon |
| 5,654,657 | A | * | 8/1997 | Pearce .................... 327/163 |
| 5,710,517 | A | * | 1/1998 | Meyer .................... 327/163 |
| 6,253,252 | B1 | | 6/2001 | Schofield |
| 6,336,088 | B1 | | 1/2002 | Bauman et al. |
| 6,397,378 | B1 | | 5/2002 | Grey et al. |
| 6,557,128 | B1 | * | 4/2003 | Turnquist ................ 714/724 |
| 6,718,497 | B1 | * | 4/2004 | Whitby-Strevens ......... 714/739 |

OTHER PUBLICATIONS

National Instruments Corporation, LabVIEW, "Test Executive Reference Manual," Aug. 1997.
Johnson, Laura, "Test and Measurement—Understanding Test Executives," Webpage www.testandmeasurement.com.content/news/, Oct. 16, 2000, pp. 1-9.

* cited by examiner

*Primary Examiner*—Majid Banankhah
(74) *Attorney, Agent, or Firm*—Meyertons Hood Kivlin Kowert & Goetzel, P.C.; Jeffrey C. Hood; Jason L. Burgess

(57) ABSTRACT

A system and method for asynchronous execution of a test executive subsequence. A first test executive sequence (calling sequence) may be created and configured to asynchronously call a second test executive sequence (subsequence). In one embodiment, a "subsequence call" step may be included in the first test executive sequence, wherein the subsequence call step is operable to asynchronously call the second test executive sequence when the subsequence call step is executed. In response to executing the first test executive sequence, the second test executive sequence may also be executed, asynchronously from the first test executive sequence. The user may specify various options affecting execution of the second test executive sequence (the subsequence). For example, the user may specify various aspects of the execution environment or execution location for the subsequence.

34 Claims, 13 Drawing Sheets

SYSTEM AND METHOD ENABLING ASYNCHRONOUS EXECUTION OF A TEST EXECUTIVE SUBSEQUENCE

FIELD OF THE INVENTION

The present invention relates to the field of test executive software for organizing and executing test executive sequences. In particular, the invention relates to a system and method for enabling asynchronous execution of a test executive subsequence.

DESCRIPTION OF THE RELATED ART

Test executive software allows a user to organize and execute sequences of reusable test modules to test units under test (UUTs), e.g., test modules that involve one or more instruments that interact with the UUTs. The test modules often have a standard interface and typically can be created in a variety of programming environments. The test executive software operates as a control center for the automated test system. More specifically, the test executive software allows the user to create, configure, and/or control test sequence execution for various test applications, such as production and manufacturing test applications. Text executive software typically includes various features, such as test sequencing based on pass/fail results, logging of test results, and report generation, among others.

Test executives include various general concepts. The following comprises a glossary of test executive nomenclature:

Code Module—A program module, such as a Windows Dynamic Link Library (.dll), LabVIEW VI (.vi), or other type of program module or component, that implements one or more functions that perform a specific test or other action.

Test Module—A code module that performs a test of a UUT.

Step—An action that the user can include within a sequence of other actions. A step may call a test module to perform a specific test.

Step Module—The code module that a step calls.

Sequence—A series of steps that the user specifies for execution in a particular order. Whether and when a step is executed can depend on the results of previous steps.

Sequence File—A file that contains the definition of one or more sequences.

Sequence Editor—A program that provides a graphical user interface for creating, editing, and debugging sequences.

Run-time Operator Interface—A program that provides a graphical user interface for executing sequences on a production station. A sequence editor and run-time operator interface can be separate application programs or different aspects of the same program.

Test Executive Engine—A module or set of modules that provide an API for creating, editing, executing, and debugging sequences. A sequence editor or run-time execution operator interface uses the services of a test executive engine.

Application Development Environment (ADE)—A programming environment such as LabVIEW, LabWindows/CVI, Microsoft Visual C++, Microsoft Visual Basic, etc., in which the user can create test modules and run-time operator interfaces.

Unit Under Test (UUT)—The device or component that is being tested.

Thus, the user may use the sequence editor to construct a test executive sequence comprising a plurality of steps. The test executive sequence may then be executed to perform tests of one or more UUTs. During execution of a first test executive sequence, it is often necessary to call a second test executive sequence. In this instance, the first test executive sequence may be referred to as the "calling sequence," and the second test executive sequence may be referred to as a "subsequence". It would be desirable for the calling sequence to be able to call the subsequence asynchronously. This would enable the calling sequence to continue execution immediately after calling the subsequence, without waiting for the subsequence to execute.

SUMMARY OF THE INVENTION

One embodiment of the present invention comprises a system and method for enabling asynchronous execution of a test executive subsequence. A first test executive sequence may be created in response to user input, such as user input received by a sequence editor associated with a test executive application. The first test executive sequence may comprise a plurality of steps, including steps that reference code modules to perform tests on a unit under test (UUT). In response to user input, the first test executive sequence, also referred to as the calling sequence, may be configured to asynchronously call a second test executive sequence, also referred to as a subsequence.

The second test executive sequence may have already been created or may be created prior to execution of the first test executive sequence. Configuring the first test executive sequence to asynchronously call the second test executive sequence may be accomplished in various ways. The first test executive sequence may be configured to asynchronously call the second test executive sequence at a particular point in the first test executive sequence. In other words, a first portion of the first test executive sequence may be executed, the second test executive sequence may then be called, and then a second portion of the first test executive sequence may be executed asynchronously from the second test executive sequence. In one embodiment, a "subsequence call" step may be included in the first test executive sequence in response to user input. The subsequence call step may be operable to asynchronously call the second test executive sequence when the subsequence call step is executed. Steps in the first test executive sequence that follow the subsequence call step may be executed asynchronously from the second test executive sequence.

After the first test executive sequence is created, it may be executed. In response to executing the first test executive sequence, the second test executive sequence may also be executed, wherein the second test executive sequence executes asynchronously from the first test executive sequence. To cause execution of the second test executive sequence, the first test executive sequence may programmatically call the second test executive sequence. The second test executive sequence is preferably called asynchronously, such that the first test executive sequence immediately resumes execution without waiting for the second test executive sequence to be executed.

The second test executive sequence may be executed in a separate thread from the first test executive sequence. In one embodiment, the user may specify various options affecting execution of the second test executive sequence (the subsequence). For example, the user may specify various aspects of the execution environment or execution location for the subsequence. In one embodiment, the test executive environment may support the concept of a test executive "execution". Multiple threads may be associated with a single test executive execution. Threads in the same execution may share a single execution result tree and may produce a single test report. Also, the user may request to suspend or terminate a test executive execution, which causes all threads in the execution to suspend or terminate together.

In one embodiment, the user may specify that the subsequence should be executed in a new thread, but in the same execution. Thus, the subsequence may be executed asynchronously from the calling sequence in a new thread, but the new thread and the calling thread may share some data, such as a single result tree, may produce a single test report, etc. In another embodiment, the user may specify that the subsequence should be executed in a new execution. In this case, the subsequence may be executed asynchronously from the calling sequence in a new thread, wherein the new thread is associated with a new execution.

In another embodiment, the user may specify that the subsequence should be executed asynchronously on a remote computer system. The subsequence may be executed on the remote computer system using any of various techniques. In one embodiment, the test executive environment that executes the calling sequence may communicate with an instance of the test executive environment on the remote computer system to invoke the subsequence on the remote computer system.

The calling sequence may also be configured to synchronize with the subsequence in various ways during execution of the two sequences. For example, in one embodiment the calling sequence may be configured to wait for execution of the subsequence to complete before returning. For example, the test executive environment may receive a programmatic call to initiate execution of the calling sequence. Executing the calling sequence may cause the subsequence to be asynchronously executed, as described above. In the event that execution of the calling sequence completes before execution of the subsequence completes, the calling sequence (or the test executive environment) may wait for execution of the subsequence to complete before returning from the programmatic call to the calling sequence.

In another embodiment, the calling sequence may synchronize with the subsequence before all steps in the calling sequence are executed. For example, if a portion of the calling sequence depends on results of the subsequence, the calling sequence may wait for the subsequence to execute before the dependent portion of the calling sequence is executed. Any of various techniques may be used to configure the calling sequence to wait in this way. In one embodiment, the user may include a wait step in the calling sequence before the dependent portion and may configure the wait step to wait for the subsequence to complete and possibly to retrieve results from the subsequence. Also, in one embodiment, the calling sequence may be configured to cause the subsequence to pause execution, resume execution, etc., if desired.

In one embodiment, when the subsequence is asynchronously called, a handle to the subsequence may be obtained. This handle may be useful, for example, to wait for completion of, to pause, or to resume execution of the subsequence from within a sequence other than the calling sequence that originally called the subsequence.

BRIEF DESCRIPTION OF THE DRAWINGS

A better understanding of the present invention can be obtained when the following detailed description of the preferred embodiment is considered in conjunction with the following drawings, in which.

Figure 1:
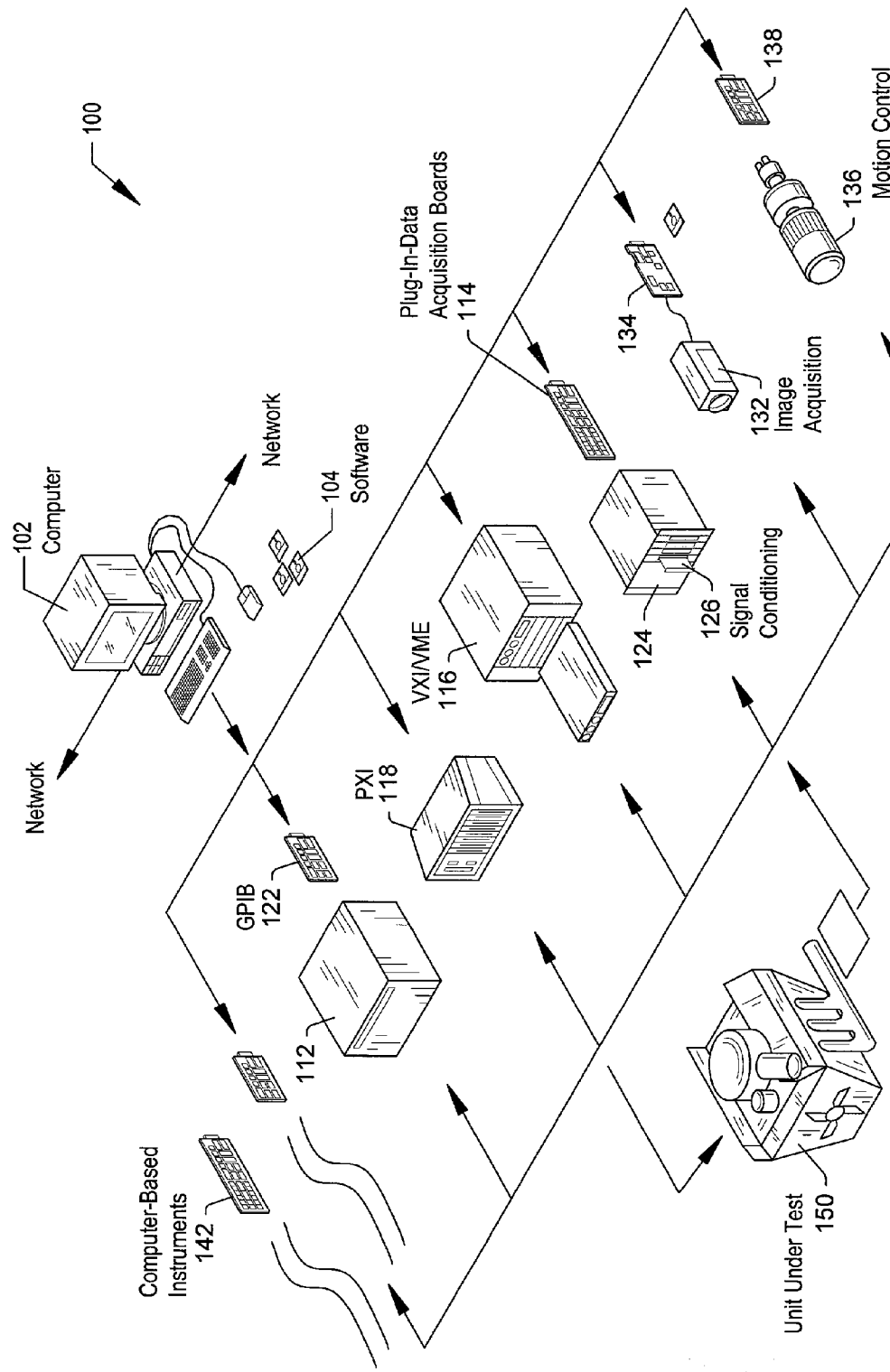
FIG. 1 illustrates an instrumentation control system according to one embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. patent application Ser. No. 09/259,162 titled "Test Executive System and Method Including Step Types for Improved Configurability," filed Feb. 26, 1999.

FIG. 1—Instrumentation System

FIG. 1 illustrates an examplary instrumentation control system 100. The system 100 comprises a host computer 102 which connects to one or more instruments. The host computer 102 comprises a CPU, a display screen, memory, and one or more input devices such as a mouse or keyboard as shown. The computer 102 may connect through the one or more instruments to analyze, measure or control a unit under test (UUT) or process 150. For example, the computer 102 may include a test executive application for performing automated tests of the unit under test. It is noted that FIG. 1 is exemplary only, and the present invention may be used in any of various systems, as desired.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via a GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and optionally interfaces through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 is coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. Other types of instruments or devices may be connected to the system, as desired.

The computer system 102 preferably includes a memory medium on which software according to one embodiment of the present invention is stored. In one embodiment, the memory medium may store test executive software that allows a user to create, configure, and/or control test executive sequence execution for various test applications, such as production and manufacturing test applications. The test executive software may enable the user to create a first test executive sequence, referred to herein as a calling sequence, that is operable when executed to invoke asynchronous execution of a second test executive sequence, referred to herein as a subsequence. The memory medium may also store test executive software operable to manage the execution of the calling sequence and/or the subsequence. As described below, in one embodiment the calling sequence and the subsequence may execute on different computer systems. In this instance, either the calling sequence or the subsequence may execute on the computer 102.

The term "memory medium" is intended to include an installation media, e.g., a CD-ROM, or floppy disks 104, a computer system memory such as DRAM, SRAM, EDO RAM, etc., or a non-volatile memory such as a magnetic medium, e.g., a hard drive, or optical storage. The host computer CPU executing code and data from the memory medium may comprise a means for implementing the methods described below.

Figure 2:
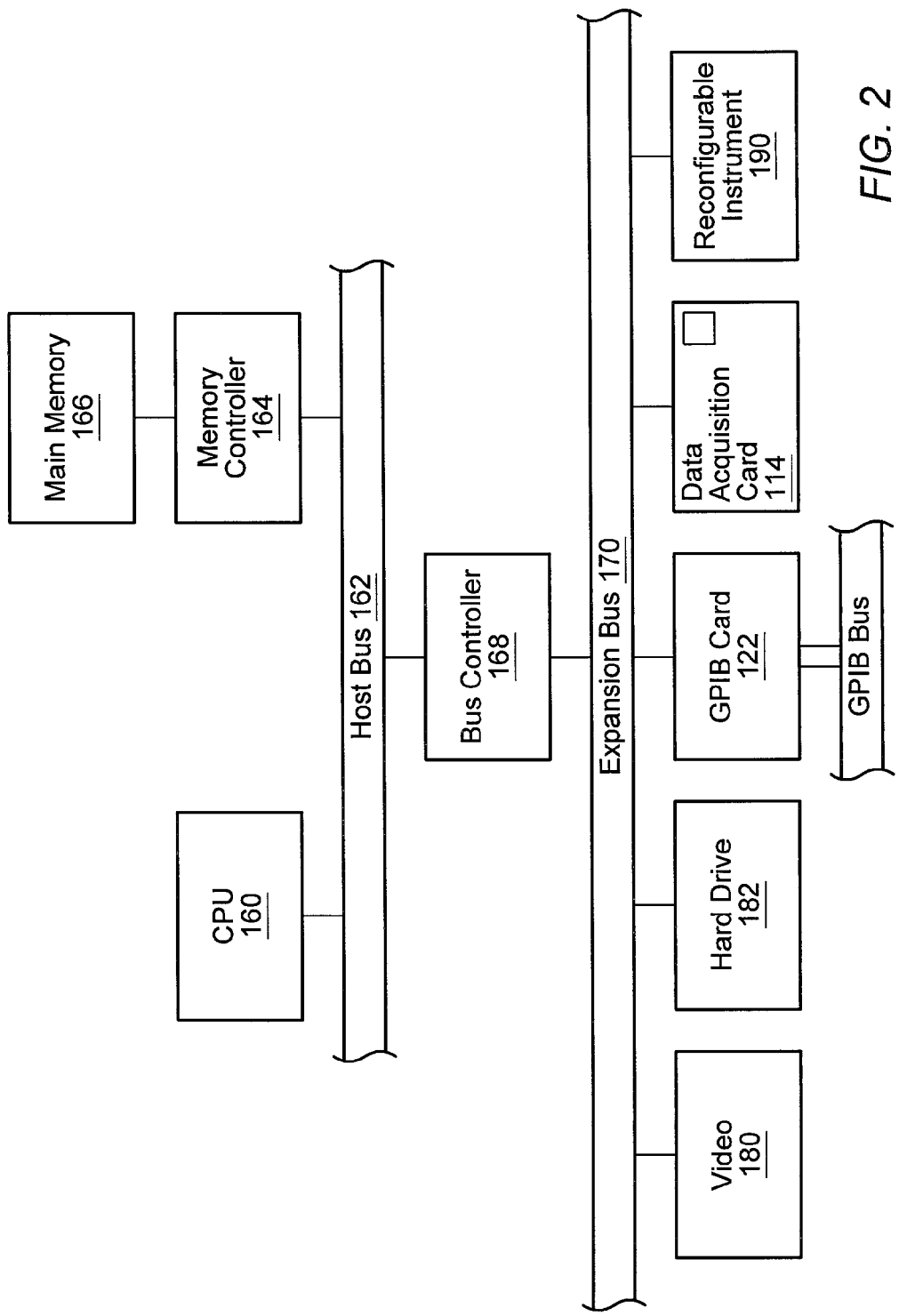
FIG. 2 is a block diagram of the computer system of FIG. 1.

FIG. 2—Computer System Block Diagram

FIG. 2 is a block diagram of the computer system illustrated in FIG. 1. It is noted that any type of computer system configuration or architecture can be used as desired, and FIG. 2 illustrates a representative PC embodiment. It is also noted that the computer system may be a general purpose computer system as shown in FIG. 1, a computer implemented on a VXI card installed in a VXI chassis, a computer implemented on a PXI card installed in a PXI chassis, or other types of embodiments. Elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store software according to one embodiment of the present invention, such as test executive software. The main memory 166 may also store operating system software as well as other software for operation of the computer system, as well known to those skilled in the art. The operation of software stored in the main memory 166 is discussed in detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1) and a GPIB interface card 122 which provides a GPIB bus interface to the GPIB instrument 112 (of FIG. 1). The computer 102 further comprises a video display subsystem 180 and hard drive 182 coupled to the expansion bus 170.

As shown, a reconfigurable instrument 190 may also be connected to the computer 102. The reconfigurable instrument 190 may include configurable logic, such as a programmable logic device (PLD), e.g., an FPGA, or a processor and memory, which may execute a real time operating system. Program instructions may be downloaded and executed on the reconfigurable instrument 190. For example, a calling test executive sequence that asynchronously calls a test executive subsequence and/or the test executive subsequence may execute on the reconfigurable instrument 190. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIG. 1.

Test Executive Software Components

Figure 3:
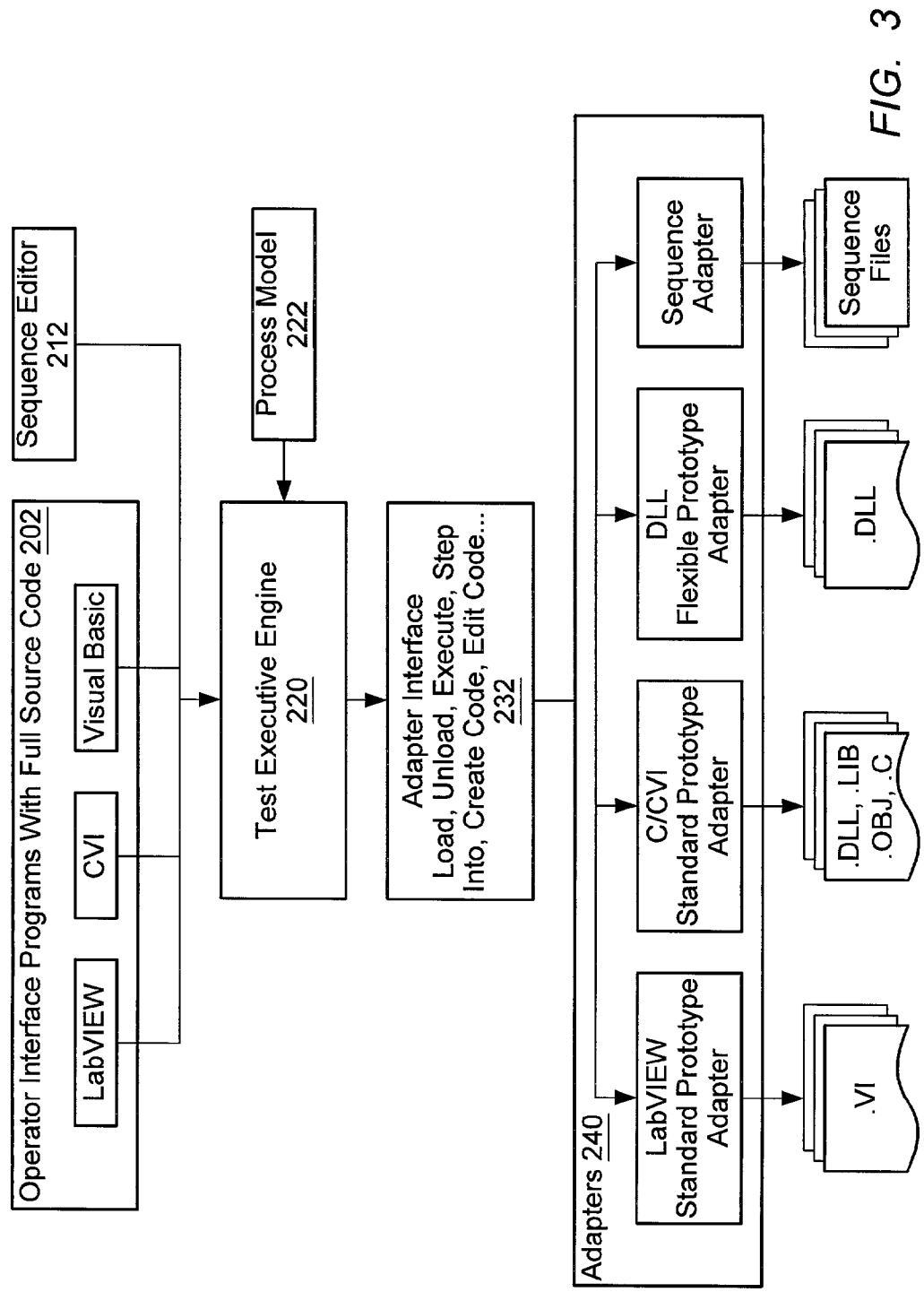
FIG. 3 illustrates a test executive application software architecture according to one embodiment of the present invention.

FIG. 3 is a block diagram illustrating high-level architectural relationships between elements of one embodiment of a test executive software application. It is noted that FIG. 3 is exemplary, and the present invention may be utilized in conjunction with any of various test executive software applications. In one embodiment, the elements of FIG. 3 are comprised in the TestStand test executive product from National Instruments. As shown, the test executive software of FIG. 3 includes operator interface programs 202 for interfacing to various software programs. The operator interface programs 202 shown in FIG. 3 are for creating operator interface programs using the LabVIEW, LabWindows/CVI, and Visual Basic application development environments. However, additional operator interface programs 202 may be included for development with other application development environments.

The test executive software of FIG. 3 also includes a sequence editor 212 for editing test executive sequences. The sequence editor 212 and the operator interface programs 202 interface to the test executive engine 220. One or more process models 222 couple to the test executive engine 220. The test executive engine 220 interfaces through an adapter interface 232 to one or more adapters 240. The adapters shown in FIG. 3 include the LabVIEW standard prototype adapter, the C/CVI prototype adapter, the DLL flexible prototype adapter, and the sequence adapter. The LabVIEW standard prototype adapter interfaces to program modules having a VI extension, i.e., LabVIEW graphical programs. The C/CVI prototype adapter interfaces to program modules having a .dll, .lib, .obj, or .c extension. The DLL flexible prototype adapter interfaces to program modules having a .dll extension. The sequence adapter interfaces to sequence files.

The test executive engine 220 manages the execution of test executive sequences. Sequences comprise steps that can call external code modules. By using module adapters 240 that have the standard adapter interface 232, the test executive engine 220 can load and execute different types of code modules. Thus, the test executive may be independent from particular application development environments (ADEs) used to create the code modules. The test executive may use a special type of sequence called a process model to direct the high-level sequence flow. The test executive engine 220 may export an API used by the sequence editor 212 and run-time operator interfaces 202.

Test Executive Sequence Editor

The sequence editor 212 is an application program in which the user creates, modifies, and debugs sequences. The sequence editor 212 may have a graphical user interface (GUI) enabling a user to efficiently create a test executive sequence for testing a unit under test. For example, the sequence editor 212 may provide the user with easy access to test executive features, such as step types, step properties, sequence parameters, step result collection, etc. The sequence editor 212 may also include an execution window that provides debugging tools such as found in application development environments such as LabVIEW, LabWindows/CVI, and Microsoft Visual C/C++. These may include features such as breakpoints, single stepping, stepping into or over function calls, tracing, a variable display, and a watch window.

In one embodiment, in the sequence editor 212, the user may start multiple concurrent executions. Multiple instances of the same sequence can be executed, and different sequences can be executed at the same time. Each execution instance has its own execution window. In trace mode, the execution window displays the steps in the currently executing sequence. When execution is suspended, the execution window may display the next step to execute and provide single-stepping options. As described below, the user may utilize the sequence editor 212 to interactively create a test executive sequence that asynchronously calls another test executive sequence.

Test Executive Engine

The test executive engine 220 may be used for creating, editing, executing, and debugging test executive sequences. The test executive engine 220 may also provide an application programming interface (API) that enables another program to interface with the test executive engine 220 in order to perform these actions. In one embodiment, the test executive engine 220 comprises a set of DLLs that export an object-based or component-based API, preferably an ActiveX Automation API. The sequence editor 212 and run-time operator interfaces 202 may use the Test Executive Engine API (Engine API). In one embodiment, the Engine API may be called from any programming environment that supports access to ActiveX Automation servers. Thus, the Engine API may be called from test modules, including test modules that are written in LabVIEW and LabWindows/CVI, Visual C++, etc.

One task performed by the test executive engine 220 is to manage the execution of test executive sequences. Executing a sequence may comprise executing steps included in the sequence. Not all steps in the sequence are necessarily executed. For example, the user may configure some steps to be skipped, e.g., depending on results of previous steps. For a step that references a user-supplied code module, executing the step may comprise executing the respective code module. In addition to these user-supplied code modules being executed, for each step, additional program instructions may be executed, wherein these additional program instructions implement additional functionality specified for the step when the step was included in the sequence. These additional program instructions may be defined by the test executive software, rather than being defined by the respective user-supplied code module for the step. As one example, if the user configured execution results of the step to be collected, then program instructions to store the step results accordingly may be executed in addition to the program instructions of the respective user-supplied code module. It is noted that not all steps may reference a user-supplied code module. For example, the test executive may provide some step types that primarily affect various aspects of sequence execution and are not designed to reference user-supplied code modules.

Figure 4:
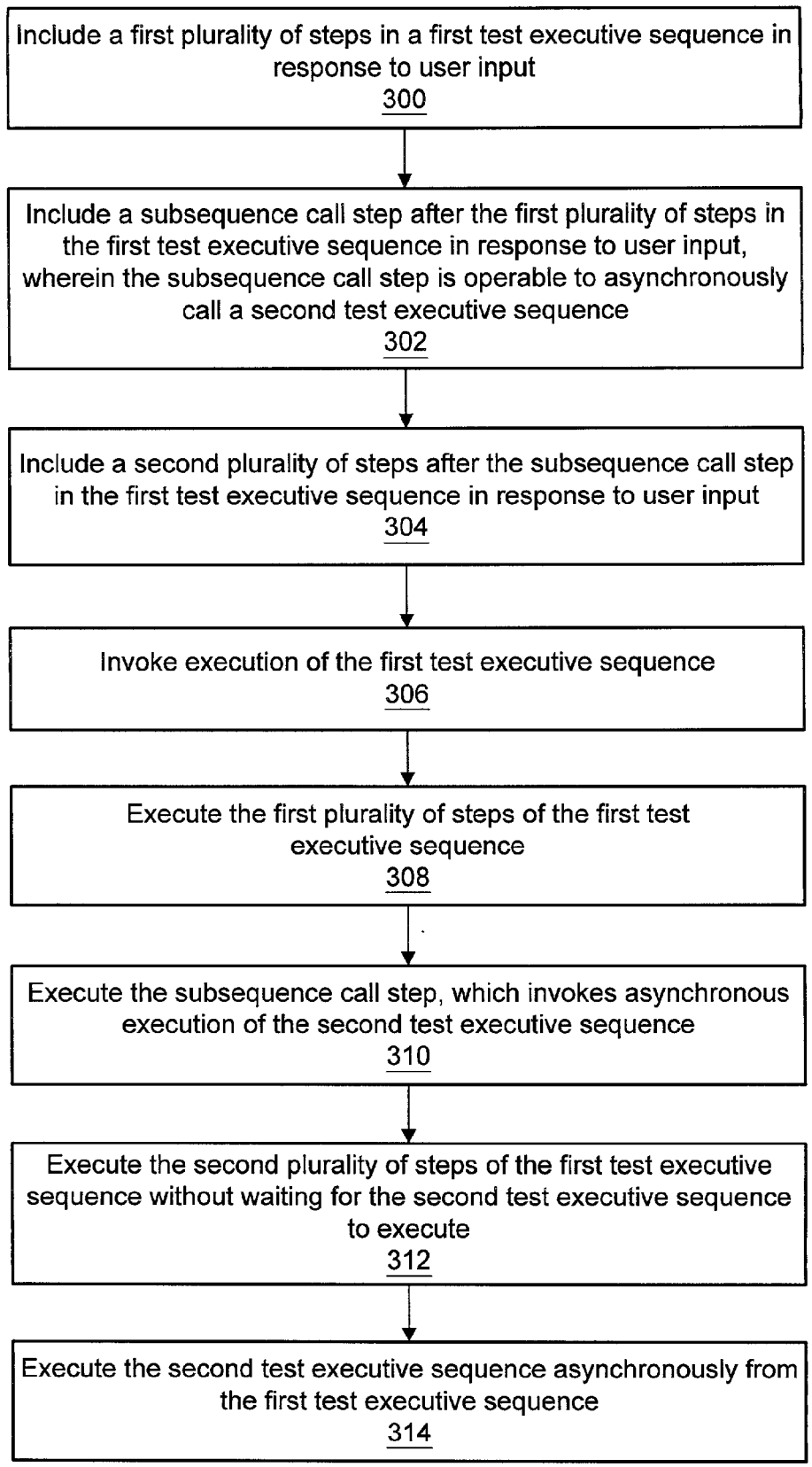
FIG. 4 is a flowchart diagram illustrating one embodiment of a method for asynchronously executing a test executive subsequence.

FIG. 4—Asynchronously Executing a Test Executive Subsequence

FIG. 4 is a flowchart diagram illustrating one embodiment of a method for asynchronously executing a test executive subsequence. In steps 300–304 a first test executive sequence, also referred to as a calling sequence, may be created. As described above, the user may utilize a sequence editor program to create the first test executive sequence.

In step 300, a first plurality of steps may be included in the first test executive sequence, in response to user input. This first plurality of steps may comprise steps that are to be executed before the desired subsequence is asynchronously called.

In step 302, a step referred to herein as a "subsequence call" step may be included after the first plurality of steps in the first test executive sequence, in response to user input. When executed, the subsequence call step is operable to asynchronously call a second test executive sequence, i.e., the desired subsequence. In step 302, the subsequence call step may also be configured in response to user input. For example, the user input may specify the second test executive sequence to be asynchronously called. Also, as described below, the user input may also specify various options affecting the execution of the second test executive sequence, such as whether to execute the second test executive sequence on a remote computer system, etc. Also, the user input may specify one or more parameters to pass to the second test executive sequence.

In step 304, a second plurality of steps may be included after the subsequence call step in the first test executive sequence, in response to user input. This second plurality of steps may comprise steps that are to be executed after the second test executive sequence is asynchronously called, but without waiting for the second test executive sequence to execute.

In step 306, execution of the first test executive sequence may be invoked. For example, the first test executive sequence may be invoked in response to a user request received via a graphical user interface of the test executive software or in response to a programmatic call to initiate execution of the first test executive sequence.

In step 308, the first plurality of steps of the first test executive sequence may be executed.

In step 310, the subsequence call step may be executed, which may asynchronously call the second test executive sequence.

In step 312, the second plurality of steps of the first test executive sequence may be executed. Since the second test executive sequence was called asynchronously, the second plurality of steps may execute immediately without waiting for the second test executive sequence to execute.

In step 314, the second test executive sequence may be executed asynchronously from the first test executive sequence.

It is noted that in other embodiments, the second test executive sequence (subsequence) may be asynchronously called using any of various other techniques besides including a subsequence call step in the first test executive sequence (calling sequence). Instead of including a separate step in the calling sequence to call the subsequence, the test executive may enable the user to configure the calling sequence to asynchronously invoke the subsequence in various other ways. For example, the test executive may enable the user to set sequence properties of the calling sequence, where the properties specify information such as: a subsequence to asynchronously invoke, a point in the calling sequence at which to invoke the subsequence, etc. In another embodiment, the user may be able to set properties of another step in the calling sequence, e.g., so that in addition to executing a user-specified code module associated with the step, the step also asynchronously calls the desired subsequence.

The subsequence may be executed asynchronously from the calling sequence using any of various techniques. The subsequence may be executed in a separate thread than the calling sequence. In one embodiment, when creating the calling sequence, the user may specify various options affecting execution of the subsequence. For example, the user may specify various aspects of the execution environment or execution location for the subsequence. In one embodiment, the test executive environment may support the concept of a test executive "execution". Multiple threads may be associated with a single test executive execution. Threads in the same execution may share certain information. For example, these threads may share a single execution result tree and may produce a single test report. Also, the user may request to suspend or terminate a test executive execution, which causes all threads in the execution to suspend or terminate together.

In one embodiment, the user may specify that the subsequence should be executed in a new thread, but in the same execution. Thus, the subsequence may be executed asynchronously from the calling sequence in a new thread, but the new thread and the calling thread may share some data, such as a single result tree, may produce a single test report, etc. In another embodiment, the user may specify that the subsequence should be executed in a new execution. In this case, a new execution may be created, and the subsequence may be executed asynchronously in a new thread associated with the new execution.

In another embodiment, the user may specify that the subsequence should be executed asynchronously on a remote computer system, such as a remote computer system coupled via a network to the computer system that executes the calling sequence. The subsequence may be executed on the remote computer system using any of various techniques. In one embodiment, the test executive environment that executes the calling sequence may communicate with an instance of the test executive environment on the remote computer system to invoke the subsequence on the remote computer system.

The calling sequence may also be configured to synchronize with the subsequence in various ways during execution of the two sequences. For example, in one embodiment the calling sequence may be configured to wait for execution of the subsequence to complete before returning. For example, the test executive environment may receive a programmatic call to initiate execution of the calling sequence. Executing the calling sequence may cause the subsequence to be asynchronously executed, as described above. In the event that execution of the calling sequence completes before execution of the subsequence completes, the calling sequence (or the test executive environment) may wait for execution of the subsequence to complete before returning from the programmatic call to the calling sequence.

In another embodiment, the calling sequence may be configured to synchronize with the subsequence before all steps in the calling sequence are executed. For example, a portion of the calling sequence may need to execute after the subsequence completes execution. For example, if a portion of the calling sequence depends on results of the subsequence, the calling sequence may be configured to wait for the subsequence to execute before the dependent portion of the calling sequence is executed. In this example, a plurality of steps may be included in the calling sequence after the point at which the subsequence is asynchronously called. During execution of the calling sequence, a subset of this plurality of steps may be executed after the subsequence is asynchronously called. The calling sequence may then wait for the subsequence to complete execution before executing the remaining steps in this plurality of steps.

Any of various techniques may be used to configure the calling sequence to wait in this way. In one embodiment, the user may include a wait step in the calling sequence before the dependent portion and may configure the wait step to wait for the subsequence to complete and possibly to retrieve results from the subsequence.

The calling sequence may also synchronize with the subsequence in various other ways. For example, the calling sequence may be configured to cause the subsequence to pause execution, resume execution, etc., at desired points or if certain conditions occur. In one embodiment, when a subsequence is asynchronously called, a handle to the subsequence may be obtained. Sequences other than the calling sequence that originally invoked the subsequence may use this handle to interact with the subsequence. For example, the handle may allow another sequence to wait for completion of, to pause, or to resume execution of the subsequence.

It is noted that in the preferred embodiment, a calling sequence may asynchronously call more than one subsequence. For example, the calling sequence may include multiple subsequence call steps, each of which asynchronously calls a different subsequence. In another embodiment, a single subsequence call step may be configured to asynchronously call multiple subsequences. Also, a calling sequence may call a subsequence synchronously if desired. For example, when creating the calling sequence, the user may specify whether the subsequence is to be called synchronously or asynchronously.

FIGS. 5–13: Exemplary Dialog Boxes

FIGS. 5–13 illustrate exemplary dialog boxes enabling a user to create a calling sequence that asynchronously calls a subsequence. It is noted that these dialog boxes correspond to one specific embodiment of a test executive application that implements the above-described method, and numerous alternative embodiments are contemplated.

Figure 5:
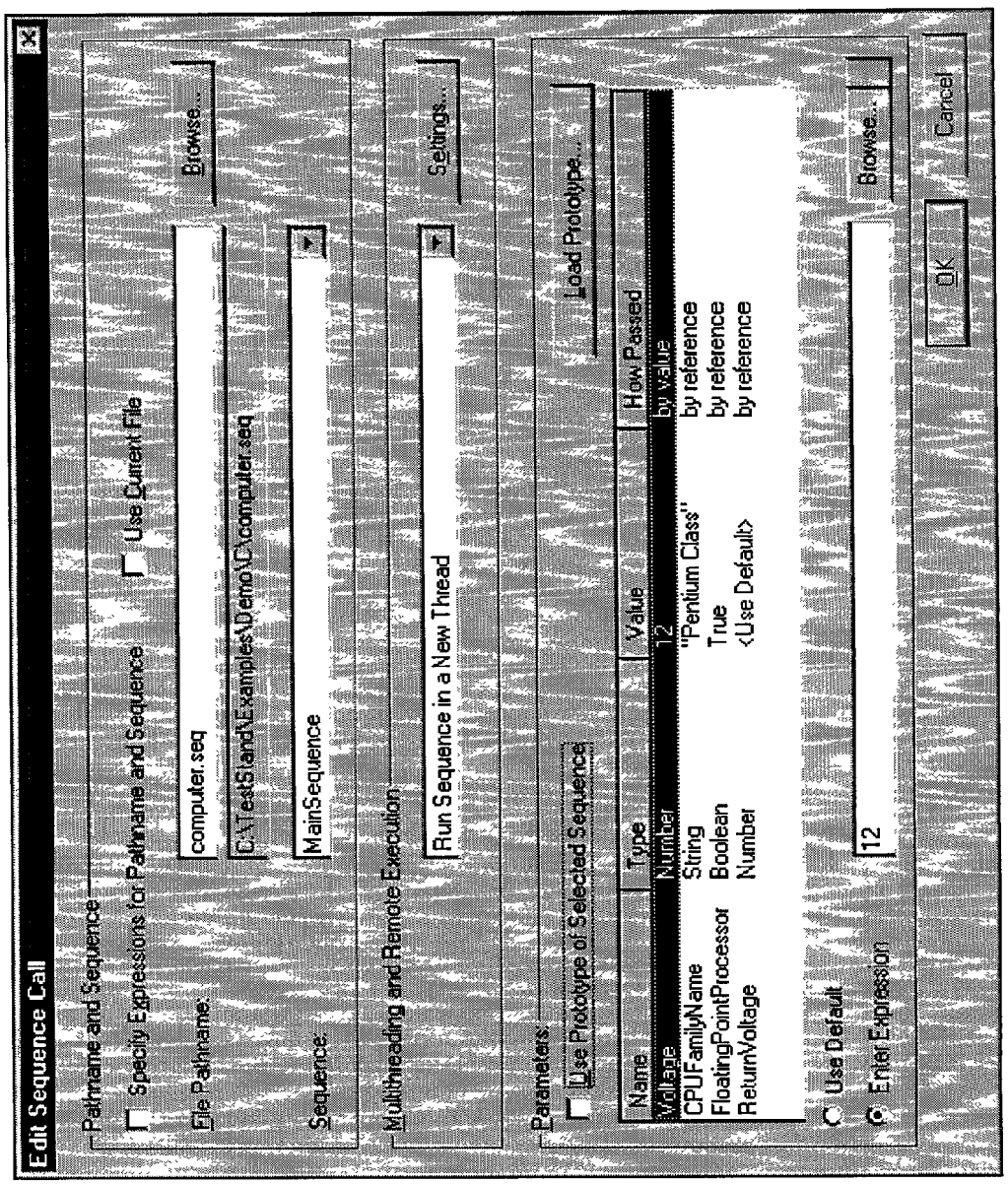
FIG. 5 illustrates one embodiment of a dialog box for configuring a call to a subsequence.

FIG. 5 illustrates a dialog box for configuring a call to a subsequence. For example, the dialog box of FIG. 5 may be used to configure a "subsequence call" step included in a calling sequence. This dialog box includes the following controls:

Specify Expressions for Pathname and Sequence: Selects whether the sequence name and the sequence file pathname are specified through literal strings or through expressions that are evaluated at run time. When literal strings are used, the actual pathname of the sequence file is entered in the File Pathname control.

Use Current File: This checkbox may be enabled if the user wants to call a sequence in the sequence file that the user is currently editing. The File Pathname or File Path Expression control dims when the user enables the Use Current File checkbox.

File Pathname: Specifies the pathname of the sequence file that defines the subsequence to be called.

Sequence: Contains the names of the sequences in the sequence file the user specifies. When the user uses expressions, the File Path Expression and Sequence Expression controls appear in place of the File Pathname and Sequence controls. The user uses these controls to specify the expressions for the sequence file pathname and the sequence name.

Multithreading and Remote Execution: Allows the user to specify that the subsequence being called runs in a separate thread, in a separate execution, and/or on a remote computer system. The ring control contains the following items:

None: Specifies that the subsequence runs (synchronously) in the current thread.

Run Sequence in a New Thread: Specifies that the subsequence runs asynchronously in a new thread within the current execution. Threads in the same execution may share the same report and the same result tree.

Run Sequence in a New Execution: Specifies that the subsequence runs asynchronously in a new execution. Separate executions have separate reports and result trees.

Run Sequence on Remote Computer: Specifies that the subsequence runs on the remote computer the user specifies. To execute the sequence remotely, the sequence adapter connects to an instance of the test executive on the remote machine.

Settings: When clicked, displays a dialog box in which the user configures multithreading and remote execution settings. The dialog box varies according to the selection the user makes in the ring control. The various dialog boxes are described below.

Parameters: Contains the following items:

Use Prototype of Selected Sequence: When enabled, updates the contents of the parameter list box whenever the user selects a different sequence from the Sequence ring control. When the user enables Specify Expressions for Pathname and Sequence, the user cannot use this option.

Load Prototype: Loads a prototype from a sequence that has the same parameter list definition as the sequences that the step might call. The user uses this button when Specify Expressions for Pathname and Sequence is enabled.

List Box: Displays the parameters that the step passes to the subsequence. For each parameter, the list box shows the name of the parameter, its data type, the value the step passes to the sequence, and whether the step passes the argument by value or by reference.

Use Default: When enabled, the step passes the default value that the sequence defines for the parameter.

Enter Expression: Specifies the value that the step passes for a parameter. The user can specify an expression that is evaluated at runtime. The parameter definition in the sequence determines whether the step passes the argument by value or by reference.

The step can specify fewer parameters than the subsequence specifies. The data types for the parameters in the step must be compatible with the corresponding parameters in the sequence. The adapter uses the default values for the parameters that the step does not pass explicitly. When the user calls a subsequence on a remote host, the user can pass single-valued properties or arrays of number, Boolean, and string properties. The user can pass these properties by value or by reference. The user also can pass container properties or ActiveX reference properties to a remote sequence if the receiving parameter type is an ActiveX reference property.

Thread Settings

Figure 6:
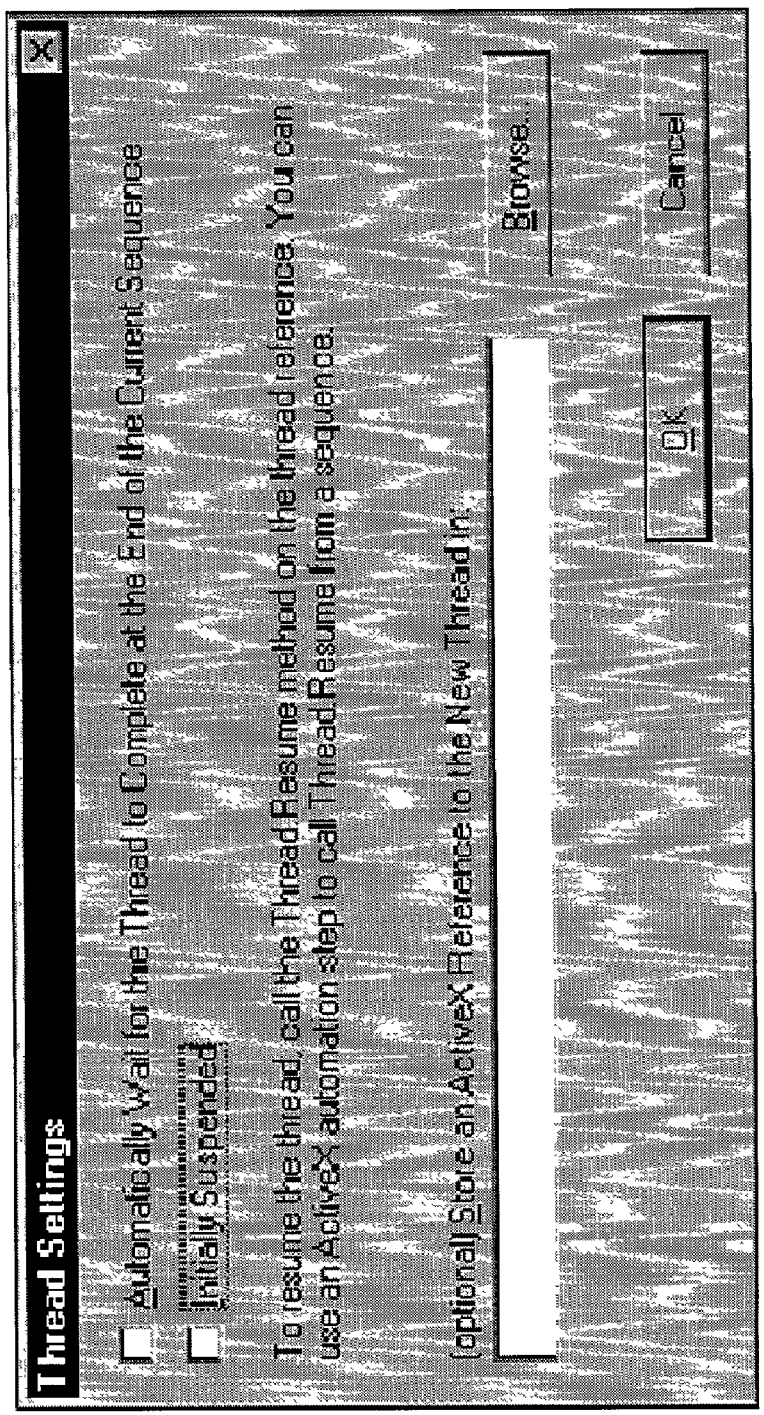
FIG. 6 illustrates one embodiment of a dialog box for configuring a subsequence call for a subsequence to be executed in a new thread, but in the same "execution" as the calling sequence.

If the user specifies that the subsequence runs in a new thread, the Settings button on the dialog box of FIG. 5 displays the Thread Settings dialog box, shown in FIG. 6. The Thread Settings dialog box contains the following controls:

Automatically Wait for the Thread to Complete at the End of the Current Sequence: Specifies that the calling sequence waits for the thread it launches to complete before the calling sequence returns.

Initially Suspended: Specifies that the new thread is created in a suspended state. The user can call a Thread.Resume method to start the thread.

Store an ActiveX Reference to the New Thread in: Stores a reference to the new Thread object in the ActiveX reference variable the user specifies. The user can use this reference in subsequent calls to the test executive API. The user also can use this reference in a Wait step to wait for the thread to complete.

Execution Settings

Figure 7:
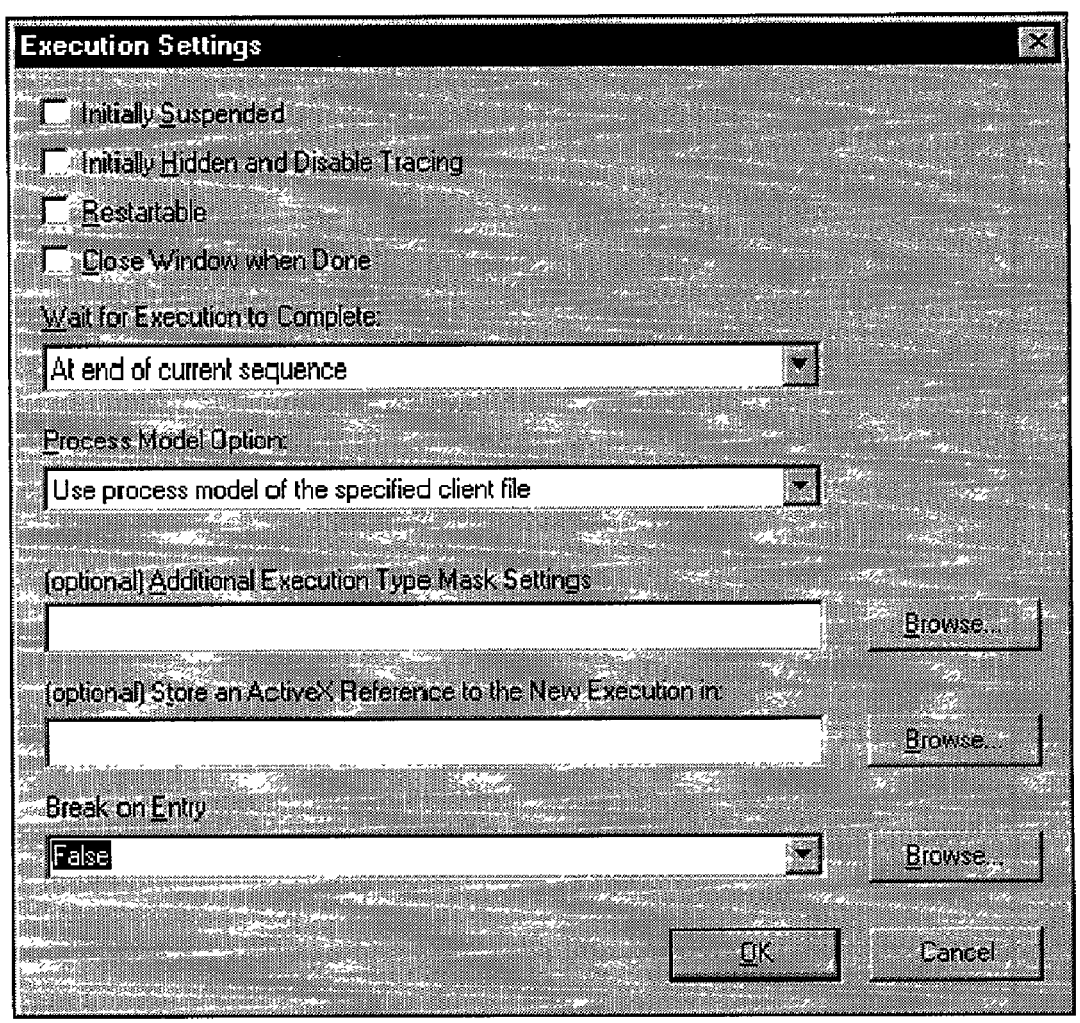
FIG. 7 illustrates one embodiment of a dialog box for configuring a subsequence call for a subsequence to be executed in a new thread and in a new "execution"

If the user specifies that the subsequence runs in a new execution, clicking the Settings button on the dialog box of FIG. 5 displays the Execution Settings dialog box, shown in FIG. 7. The Execution Settings dialog box contains the following controls:

Initially Suspended: Specifies that the new execution is created in a suspended state. The user can call an Execution.Resume method in the test executive API to start the execution.

Initially Hidden and Disable Tracing: Specifies that the window for the new execution is initially hidden and that tracing is initially turned off.

Restartable: Specifies whether the execution can be restarted after it completes.

Close Window when Done: Specifies that the window for the execution closes when the execution completes.

Wait for Execution to Complete: Specifies whether to wait for the execution to complete. The user can select from the following options in the ring control.

Do not wait: The calling sequence does not wait for the execution to complete.

Before executing next step: The calling sequence waits for the execution to complete before it executes another step.

At end of current sequence: The calling sequence waits for the execution to complete before the calling sequence returns.

Process Model Option: Specifies which process model the new execution uses. The user can select from the following options in the ring control:

Do not use a process model: The new execution does not run under a process model.

Use process model of specified client file: The execution runs under the model that the specified sequence file uses as its model. If the file the user calls does not specify a model, the execution runs under the default station model. When the user selects this option, the user may designate which entry point to call in the process model. Typically, the process model entry point then calls the MainSequence in the client sequence file the user specifies.

Use a specific process model: When the user selects this option, the user may specify the process model under which the new execution runs. The user also specifies which entry point to call in the process model. Typically, the process model entry point then calls the MainSequence in the client sequence file the user specify Additional Execution Type Mask Settings: Provides the option of passing a numeric value that specifies execution mask settings for the new execution.

Store an ActiveX Reference to the new Execution in: Stores a reference to the new Execution object in the ActiveX reference variable the user specifies. The user can use this reference in subsequent calls to the test executive API. The user also can use this reference in a Wait step to wait for the execution to complete.

Break on Entry: Suspends execution before executing the first step, when set to True.

Remote Execution Settings

Figure 8:
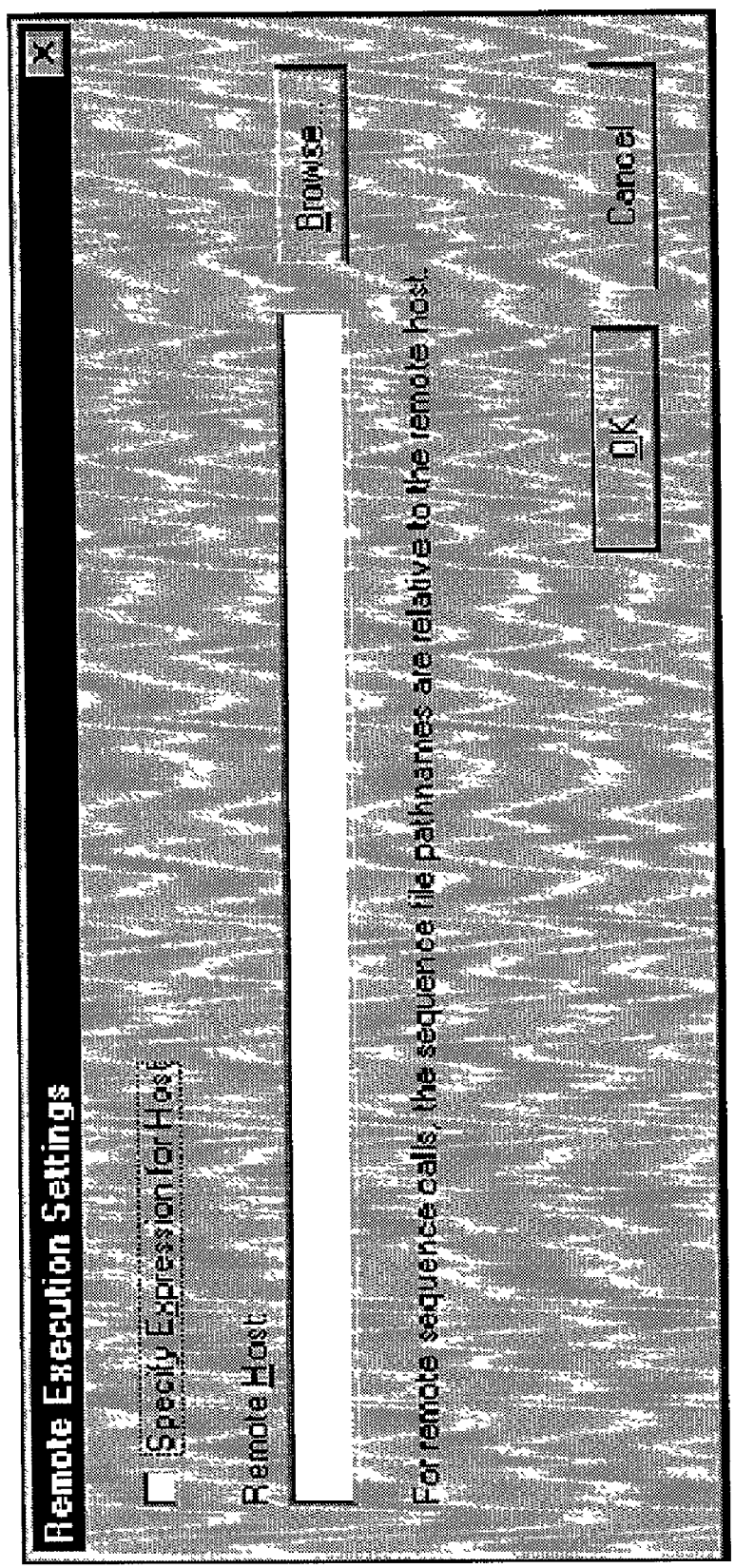
FIG. 8 illustrates one embodiment of a dialog box for configuring a subsequence call for a subsequence to be executed on a remote computer system.

If the user specifies that the subsequence runs on a remote computer, clicking the Settings button on the dialog box of FIG. 5 displays the Remote Execution Settings dialog box, shown in FIG. 8. The Remote Execution Settings dialog box contains the following controls:

Specify expression for host: Selects whether the user specifies the remote host name through literal strings or through expressions that are evaluated at run time. When the user disables the option, the user can use the Browse button to select a remote host name on the network. When the user enables the option, the user can use the Browse button to build an expression.

Remote Host: Contains the name of the remote host. When the user specifies a sequence file pathname and the user enables the step for remote execution, the test executive may locate the sequence file according to the type of path. When the user edits a step in a sequence file on a client and the user specifies an absolute or relative path for the sequence file the step calls, the test executive resolves the path for the sequence file on the client system. When the user runs the step on the client, the test executive resolves the path for the sequence file on the server system.

The user has various ways to manage the remote sequence files for remote execution:

Add a common pathname to the search paths for the client and the server so that each resolves to the same relative pathname.

Duplicate the files on the client and server system so that the client edits an identical file to the file that the server runs.

Use absolute paths that specify a mapped network drive or full network path so that the file that the client edits and the file the server runs are the same sequence file.

If the user wants the test executive to invoke a sequence on a remote server host, the user must properly configure the server on the remote system. This may include enabling the test executive on the server to accept remote execution requests.

Wait Step Type

As described above, in one embodiment a wait step may be included in a calling test executive sequence or another sequence. The wait step may reference the asynchronously executing subsequence and may be operable to wait until the subsequence completes execution. Results of the subsequence may then be retrieved if desired. In the event that the subsequence has already completed execution when the wait step is executed, the wait step may return immediately. The following sections describe one embodiment of a wait step.

Wait for Time Interval Operation

Figure 9:
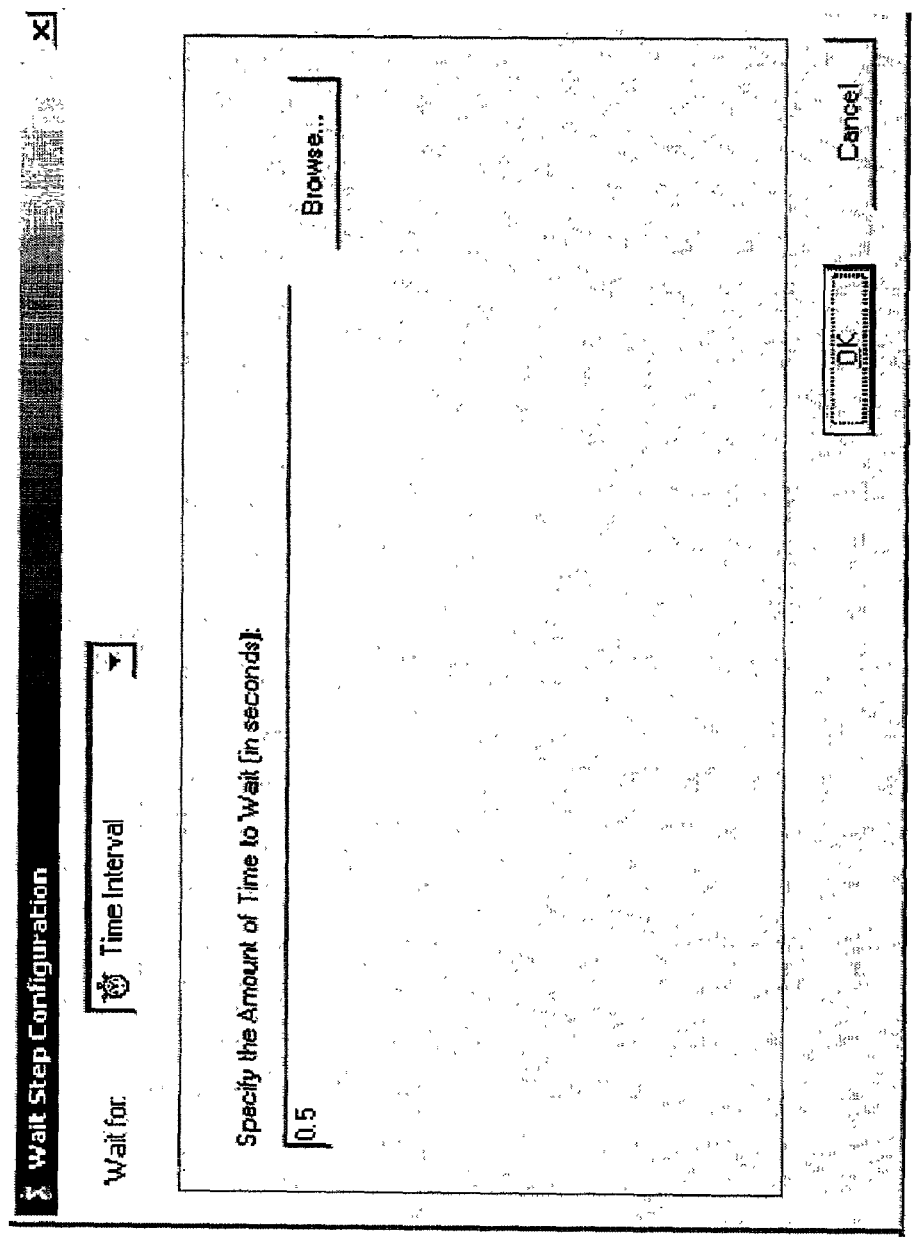
FIGS. 9–13 illustrate exemplary dialog boxes related to a wait step that may be included in a calling sequence, e.g., to wait until a subsequence completes execution and to retrieve execution results of the subsequence.

The Wait for Time Interval operation may be used to cause a thread to wait for a specified duration. The thread may sleep while waiting, thus relinquishing its processing time to other threads. FIG. 9 illustrates an exemplary dialog box for configuring a Wait step, in which a "Time Interval" option has been selected for the wait type. The following GUI controls enable the user to configure the Wait for Time Interval operation:

Specify the Amount of Time to Wait—This control may be used to specify a numeric expression that indicates the amount of time for the thread to wait in seconds.

Wait for Time Multiple Operation

Figure 10:
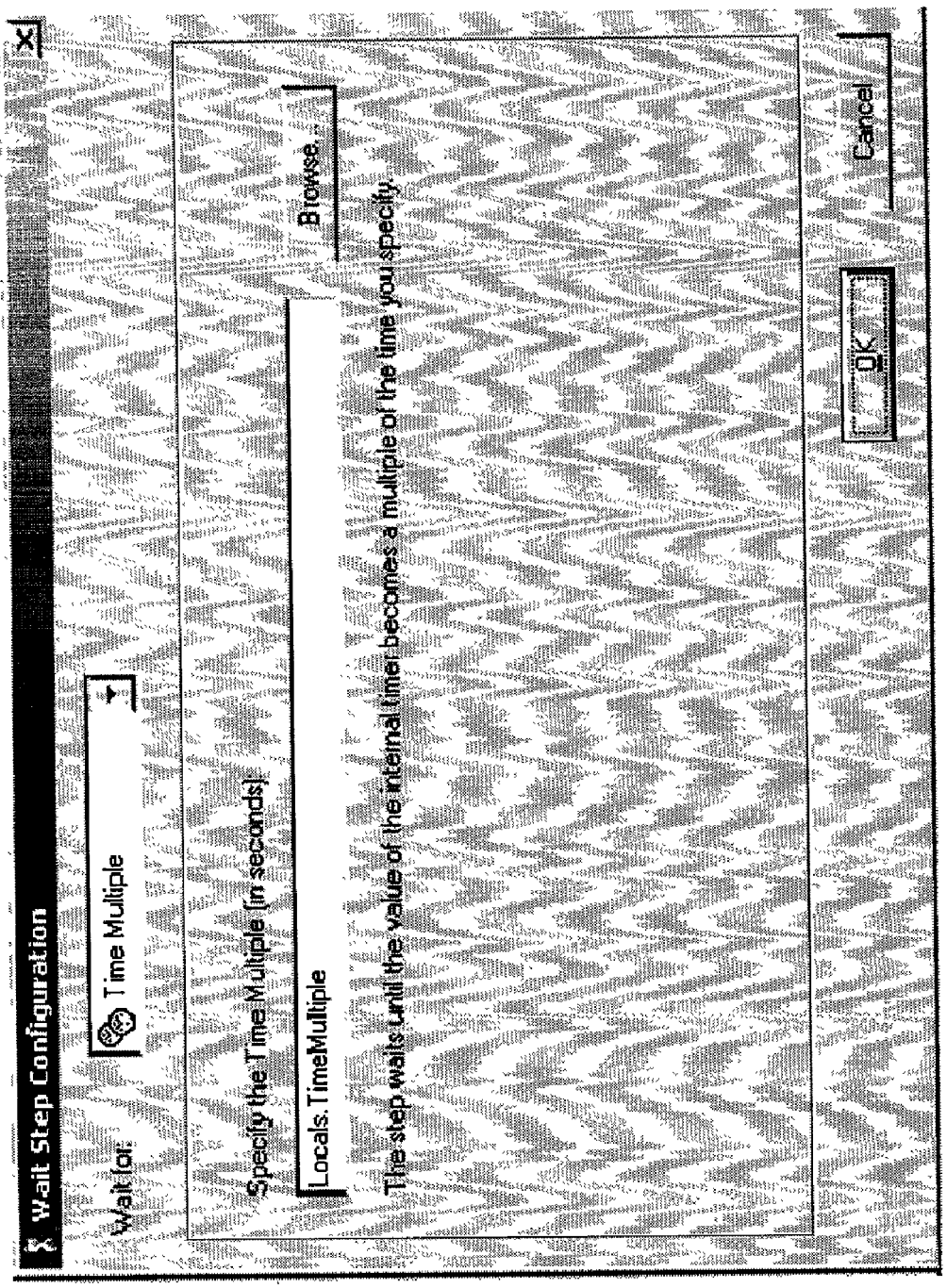

The Wait for Time Multiple operation may be used to cause a thread to wait until the value of the internal timer becomes a multiple of the specified time. A common use of the Wait for Time Multiple operation is to force a loop to cycle at a specific rate. FIG. 10 illustrates an exemplary dialog box for configuring a Wait step, in which a "Time Multiple" option has been selected for the wait type. The following GUI controls enable the user to configure the Wait for Time Multiple operation:

Specify the Time Multiple—This control may be used to specify a numeric expression that indicates the time multiple used in deciding how long to wait.

Wait for Thread Operation

Figure 11:
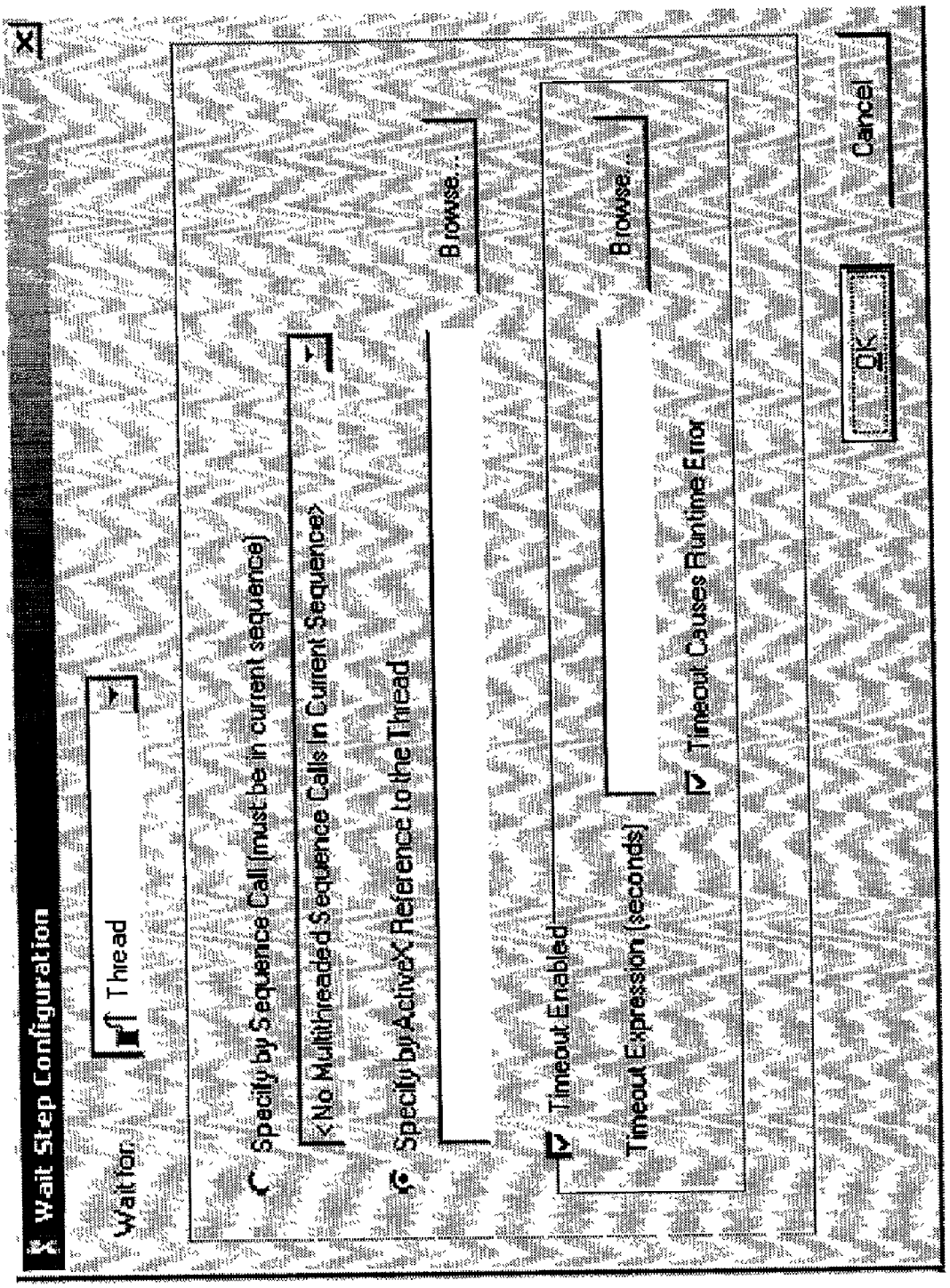

The Wait for Thread operation may be used to wait until an asynchronous sequence call thread completes and to retrieve its results. FIG. 11 illustrates an exemplary dialog box for configuring a Wait step, in which a "Thread" option has been selected for the wait type. The following GUI controls enable the user to configure the Wait for Thread operation:

Specify by Sequence Call—This control may be used to specify the thread to wait for by selecting an asynchronous sequence call within the same sequence as the wait step.

Specify by ActiveX Reference to Thread—This control may be used to specify the thread to wait for using an ActiveX reference to the thread. By specifying the thread with a reference variable, threads that other sequences and executions create can be referred to.

Timeout Enabled, Timeout Expression, Timeout, Causes Run-Time Error—These controls may be used to specify a timeout and timeout behavior when waiting for the thread to finish executing. If a timeout occurs, the property Step.Result.TimeoutOccurred is set to True.

Wait for Execution Operation

Figure 12:
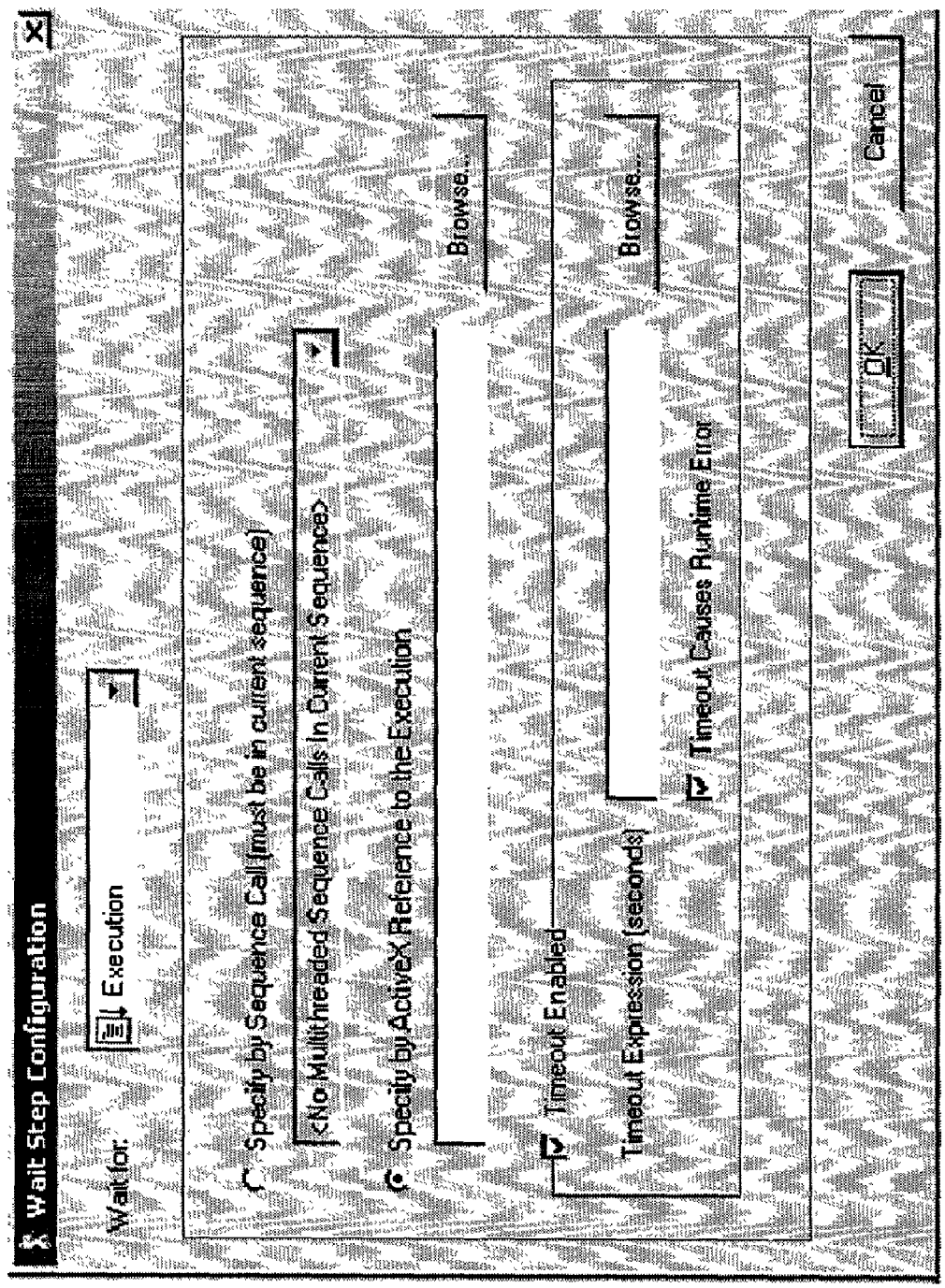

The Wait for Execution operation may be used to wait for the completion of an execution. FIG. 12 illustrates an exemplary dialog box for configuring a Wait step, in which an "Execution" option has been selected for the wait type. The following GUI controls enable the user to configure the Wait for Execution operation:

Specify an ActiveX Reference to the Execution—This control may be used to specify an ActiveX reference to the execution on which to wait.

Timeout Enabled, Timeout Expression, Timeout Causes Run-Time Error—These controls may be used to specify a timeout and timeout behavior when waiting for an execution. If a timeout occurs, the property Step.Result.TimeoutOccurred is set to True.

Wait Step Properties

Figure 13:
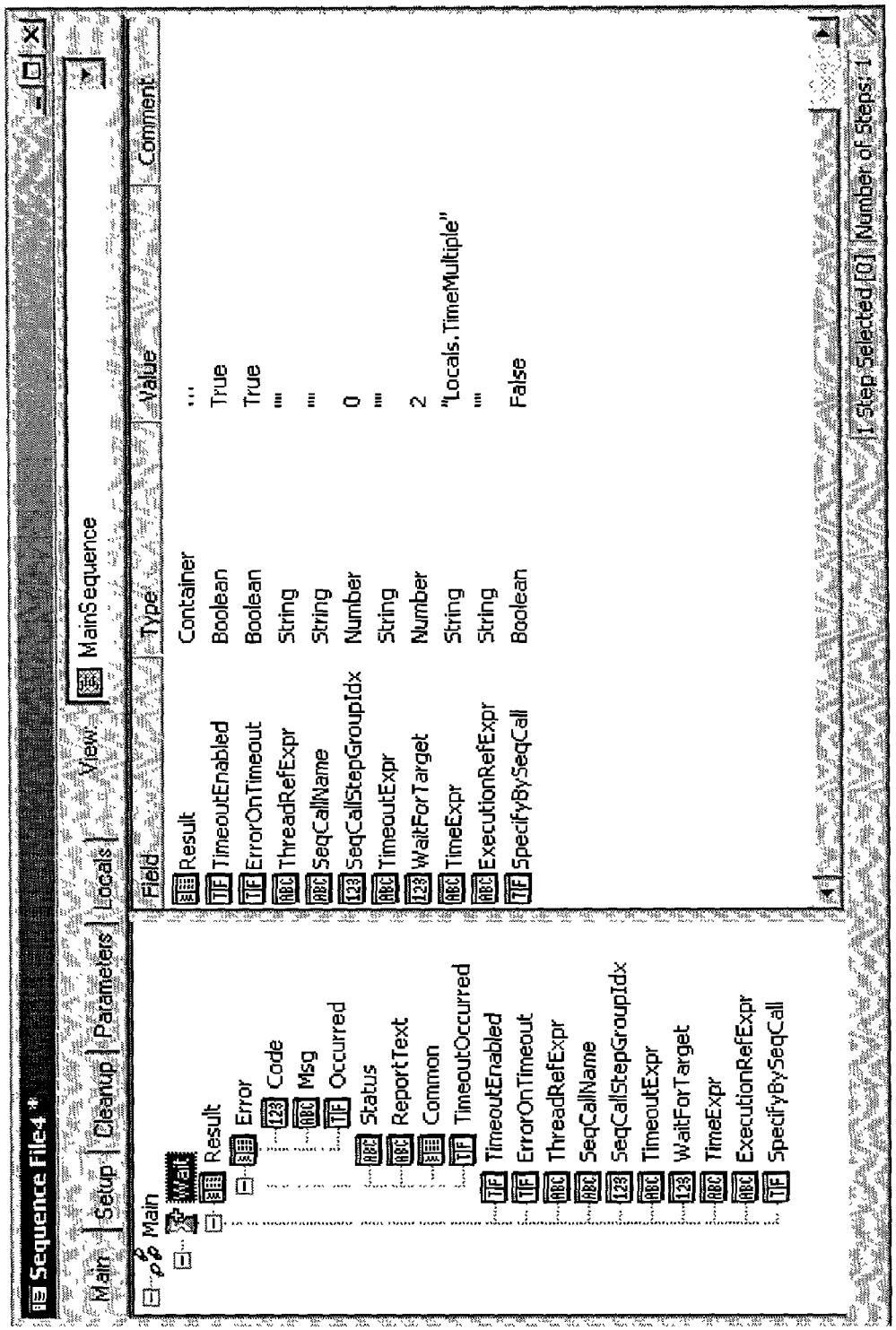

The Wait step type may define various Wait step properties in addition to the common custom properties. For example, FIG. 13 illustrates the following Wait step properties:

Step.Result.TimeoutOccurred is set to True if the Wait for Thread or Wait for Execution operation times out. This property exists only if the step is configured for one of these operations.

Step.TimeoutEnabled contains the timeout enabled setting for the Wait for Thread or the Wait for Execution operation.

Step.ErrorOnTimeout contains the Timeout Causes Run-Time Error setting for the Wait for Thread or the Wait for Execution operation.

Step.SpecifyBy contains the setting that the Wait for Thread operation uses to determine whether the step waits for a thread of a sequence call or waits for a thread object the user specifies using an ActiveX reference. In one embodiment, the valid values for this setting are SEQ_CALL, which indicates that the step specifies the thread by a sequence call, and THREAD_REF, which indicates that the step specifies the thread with an ActiveX reference.

Step.ThreadRefExpr contains the thread reference expression for the Wait for Thread operation when the Step.SpecifyBy property is set to THREAD_REF.

Step.SeqCallName contains the name of the sequence call step that creates the thread the step waits for when the Step.SpecifyBy property is set to "SEQ_CALL".

Step.SeqCallStepGroupIdx contains the step group of the sequence call step that creates the thread that the step waits for when the Step.SpecifyBy property is set to SEQ_CALL. In one embodiment, the valid values are 0=Setup, 1=Main, 2=Cleanup.

Step.TimeoutExpr contains the timeout expression, in seconds, for the Wait for Thread or the Wait for Execution operation.

Step. WaitForTarget contains a value that specifies the type of wait operation the step performs. In one embodiment, the valid values are 0=Time Interval, 1=Time Multiple, 2=Thread, 3=Execution.

Step.TimeExpr contains the time expression for the Time Interval or Time Multiple operation of the step.

Step.ExecutionRefExpr contains the expression that evaluates to a reference to the execution on which the Wait for Execution operation waits.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for executing two test executive sequences, the method comprising:

creating a first test executive sequence, wherein said creating the first test executive sequence comprises including a first plurality of test executive steps in the first test executive sequence, wherein each test executive step in the first plurality of test executive steps is included in the first test executive sequence in response to user input to a sequence editor requesting inclusion of the test executive step in the first test executive sequence;

configuring the first test executive sequence to asynchronously call a second test executive sequence, in response to user input;

creating the second test executive sequence, wherein said creating the second test executive sequence comprises including a second plurality of test executive steps in the second test executive sequence, wherein each test executive step in the second plurality of test executive steps is included in the second test executive sequence in response to user input to the sequence editor requesting inclusion of the test executive step in the second test executive sequence;

executing the first test executive sequence, wherein said executing the first test executive sequence comprises executing the first plurality of test executive steps in the first test executive sequence, wherein said executing the first test executive sequence comprises the first test executive sequence asynchronously calling the second test executive sequence;

executing the second test executive sequence in response to said asynchronously calling the second test executive sequence, wherein the second test executive sequence executes asynchronously from the first test executive sequence.

2. The method of claim 1, wherein said executing the first test executive sequence and said executing the second test executive sequence comprise performing one or more tests of a unit under test (UUT), wherein the UUT comprises a hardware device.

3. The method of claim 1,
wherein said executing the first test executive sequence and said executing the second test executive sequence comprise interacting with one or more hardware devices to test a unit under test (UUT), wherein the UUT comprises a hardware device.

4. The method of claim 1, further comprising:
after said first test executive sequence asynchronously calling the second test executive sequence, executing at least a portion of the first test executive sequence without waiting for the second test executive sequence to be executed.

5. The method of claim 1,
wherein one or more of the first plurality of test executive steps in the first test executive sequence are executed after beginning execution of the second test executive sequence and without waiting for execution of the second test executive sequence to be completed.

6. The method of claim 5,
wherein said including the first plurality of test executive steps in the first test executive sequence comprises including a first test executive step in the first test executive sequence;
wherein said configuring the first test executive sequence to asynchronously call the second test executive sequence comprises configuring the first test executive step to asynchronously call the second test executive sequence, in response to user input;
wherein said executing the first plurality of test executive steps in the first test executive sequence comprises executing the first test executive step, wherein the first test executive step executes to asynchronously call the second test executive sequence;
wherein said executing the second test executive sequence is performed in response to said executing the first test executive step.

7. The method of claim 1,
wherein said executing the first test executive sequence is performed by a first thread;
wherein said executing the second test executive sequence is performed by a second thread;
wherein the second thread is not the same thread as the first thread.

8. The method of claim 1,
wherein said executing the first test executive sequence is performed on a first computer system;
wherein said executing the first test executive sequence comprises the first test executive sequence calling the second test executive sequence for asynchronous execution on a second computer system coupled to the first computer system;
wherein said executing the second test executive sequence is performed on the second computer system coupled to the first computer system.

9. The method of claim 1,
wherein said including the first plurality of test executive steps in the first test executive sequence comprises including a wait step in the first test executive sequence;
wherein said executing the first test executive sequence includes executing the wait step after said asynchronously calling the second test executive sequence;
wherein the wait step is operable to wait for execution of the second test executive sequence to complete, without requiring program code to implement said waiting to be specified.

10. The method of claim 9, further comprising:
displaying a graphical user interface for configuring the wait step; and
configuring the wait step to wait for execution of the second test executive sequence to complete in response to user input to the graphical user interface specifying configuration information for the wait step.

11. The method of claim 1, further comprising:
in response to user input, configuring the first test executive sequence to wait for execution of the second test executive sequence to complete before returning;
receiving a programmatic call to the first test executive sequence to initiate said executing the first test executive sequence;
wherein, in performing said executing the first test executive sequence and said executing the second test executive sequence, execution of the first test executive sequence completes before execution of the second test executive sequence completes;
wherein the method further comprises:
after execution of the first test executive sequence completes, waiting for execution of the second test executive sequence to complete before returning from the programmatic call to the first test executive sequence.

12. The method of claim 1, further comprising:
configuring a portion of the first test executive sequence to execute after the second test executive sequence completes execution, in response to user input.

13. The method of claim 1,
wherein for each test executive step in the first plurality of test executive steps, no user programming is required to include the test executive step in the first test executive sequence;
wherein for each test executive step in the second plurality of test executive steps, no user programming is required to include the test executive step in the second test executive sequence.

14. The method of claim 1, further comprising:
displaying a graphical user interface of the sequence editor, wherein the graphical user interface provides access to test executive steps available for inclusion in test executive sequences;
wherein said including the first plurality of test executive steps in the first test executive sequence is performed in response to user input received to the graphical user interface requesting inclusion of the first plurality of test executive steps in the first test executive sequence;
wherein said including the second plurality of test executive steps in the second test executive sequence is performed in response to user input received to the graphical user interface requesting inclusion of the second plurality of test executive steps in the second test executive sequence.

15. The method of claim 1,
wherein said executing the first test executive sequence comprises executing the first test executive sequence under control of a test executive engine, wherein the test executive engine is operable to execute each of the first plurality of test executive steps in the first test executive sequence.

16. The method of claim 15,
wherein each test executive step in at least a subset of the first plurality of test executive steps in the first test executive sequence is configured to call an external code module;

wherein for each test executive step in the at least a subset, executing the test executive step comprises the test executive engine invoking execution of the external code module called by the test executive step.

17. The method of claim 15,
wherein said executing the second test executive sequence comprises executing the second test executive sequence under control of the test executive engine, wherein the test executive engine is operable to execute each of the second plurality of test executive steps in the second test executive sequence.

18. The method of claim 1, wherein said creating the first test executive sequence further comprises:
for at least a subset of the first plurality of test executive steps in the first test executive sequence, receiving user input to the sequence editor specifying an external code module for the test executive step to call and configuring the test executive step to call the external code module in response to the user input.

19. The method of claim 18, further comprising:
for each test executive step in the at least a subset, displaying a graphical user interface for configuring the test executive step, wherein said receiving user input specifying the external code module for the test executive step to call comprises receiving user input specifying the external code module to the graphical user interface for configuring the test executive step.

20. The method of claim 1,
wherein the first plurality of test executive steps in the first test executive sequence includes a first subset of test executive steps that are configured to execute after the second test executive sequence is asynchronously called and without waiting for the second test executive sequence to complete execution and a second subset of test executive steps that are configured to execute after the second test executive sequence is asynchronously called and after the second test executive sequence completes execution;
wherein said executing the first test executive sequence comprises:
executing the first subset of test executive steps after said asynchronously calling the second test executive sequence, without waiting for the second test executive sequence to complete execution;
waiting for the second test executive sequence to complete execution;
executing the second subset of test executive steps after the second test executive sequence completes execution.

21. The method of claim 20,
wherein the first test executive sequence includes a wait step after the first subset of test executive steps and before the second subset of test executive steps, wherein the wait step is operable to wait for the second test executive sequence to complete execution.

22. A computer-implemented method for asynchronously executing a test executive sequence, the method comprising:
including a plurality of steps in a first test executive sequence in response to user input, wherein the plurality of steps includes a first step operable to asynchronously call a second test executive sequence, wherein each step is included in the first test executive sequence without receiving user input specifying program code;
including a plurality of steps in the second test executive sequence in response to user input, wherein each step is included in the second test executive sequence without receiving user input specifying program code;
executing the first test executive sequence, wherein said executing the first test executive sequence comprises executing the first step, wherein said executing the first step comprises asynchronously calling the second test executive sequence;
executing the second test executive sequence in response to said asynchronously calling the second test executive sequence, wherein the second test executive sequence executes asynchronously from the first test executive sequence.

23. The method of claim 22,
wherein the plurality of steps in the first test executive sequence includes a first subset of steps before the first step and a second subset of steps after the first step;
wherein said executing the first test executive sequence comprises:
executing the first subset of steps;
executing the first step, wherein said executing the first step comprises asynchronously calling the second test executive sequence;
executing the second subset of steps without waiting for the second test executive sequence to execute.

24. A memory medium for executing two test executive sequences, the memory medium comprising program instructions operable to:
create a first test executive sequence, wherein said creating the first test executive sequence comprises including a first plurality of test executive steps in the first test executive sequence, wherein each test executive step in the first plurality of test executive steps is included in the first test executive sequence in response to user input requesting inclusion of the test executive step in the first test executive sequence;
configure the first test executive sequence to asynchronously call a second test executive sequence, in response to user input;
create the second test executive sequence, wherein said creating the second test executive sequence comprises including a second plurality of test executive steps in the second test executive sequence, wherein each test executive step in the second plurality of test executive steps is included in the second test executive sequence in response to user input requesting inclusion of the test executive step in the second test executive sequence;
execute the first test executive sequence, wherein said executing the first test executive sequence comprises executing the first plurality of test executive steps in the first test executive sequence, wherein said executing the first test executive sequence comprises the first test executive sequence asynchronously calling the second test executive sequence;
execute the second test executive sequence in response to said asynchronously calling the second test executive sequence, wherein the second test executive sequence executes asynchronously from the first test executive sequence.

25. The memory medium of claim 24,
wherein said executing the first test executive sequence and said executing the second test executive sequence comprise performing one or more tests of a unit under test (UUT), wherein the UUT comprises a hardware device.

26. The memory medium of claim 24, wherein the program instructions are further operable to:
after said first test executive sequence asynchronously calling the second test executive sequence, execute at least a portion of the first test executive sequence without waiting for the second test executive sequence to be executed.

27. The memory medium of claim 24,
wherein one or more of the first plurality of test executive steps in the first test executive sequence are executed after beginning execution of the second test executive sequence and without waiting for execution of the second test executive sequence to be completed.

28. The memory medium of claim 27,
wherein said including the first plurality of test executive steps in the first test executive sequence comprises including a first test executive step in the first test executive sequence;
wherein said configuring the first test executive sequence to asynchronously call the second test executive sequence comprises configuring the first test executive step to asynchronously call the second test executive sequence, in response to user input;
wherein said executing the first plurality of test executive steps in the first test executive sequence comprises executing the first test executive step, wherein the first test executive step executes to asynchronously call the second test executive sequence;
wherein said executing the second test executive sequence is performed in response to said executing the first test executive step.

29. The memory medium of claim 24,
wherein said executing the first test executive sequence is performed by a first thread;
wherein said executing the second test executive sequence is performed by a second thread;
wherein the second thread is not the same thread as the first thread.

30. The memory medium of claim 24,
wherein said executing the first test executive sequence is performed on a first computer system;
wherein said executing the first test executive sequence comprises the first test executive sequence calling the second test executive sequence for asynchronous execution on a second computer system coupled to the first computer system;
wherein said executing the second test executive sequence is performed on the second computer system coupled to the first computer system.

31. A system for executing two test executive sequences, the system comprising:
a processor;
a memory medium
wherein the processor is operable to:
create a first test executive sequence, wherein said creating the first test executive sequence comprises including a first plurality of test executive steps in the first test executive sequence, wherein each test executive step in the first plurality of test executive steps is included in the first test executive sequence in response to user input requesting inclusion of the test executive step in the first test executive sequence without specifying program code;
configure the first test executive sequence to asynchronously call a second test executive sequence, in response to user input;
create the second test executive sequence, wherein said creating the second test executive sequence comprises including a second plurality of test executive steps in the second test executive sequence, wherein each test executive step in the second plurality of test executive steps is included in the second test executive sequence in response to user input requesting inclusion of the test executive step in the second test executive sequence without specifying program code;
execute the first test executive sequence, wherein said executing the first test executive sequence comprises executing the first plurality of test executive steps in the first test executive sequence, wherein said executing the first test executive sequence comprises the first test executive sequence asynchronously calling the second test executive sequence;
execute the second test executive sequence in response to said first test executive sequence asynchronously calling the second test executive sequence;
wherein the second test executive sequence is executed asynchronously from the first test executive sequence.

32. A memory medium for asynchronously executing a test executive sequence, the memory medium comprising program instructions operable to:
include a plurality of steps in a first test executive sequence in response to user input, wherein the plurality of steps includes, a first step operable to asynchronously call a second test executive sequence, wherein each step is included in the first test executive sequence;
include a plurality of steps in the second test executive sequence in response to user input, wherein each step is included in the second test executive sequence;
execute the first test executive sequence, wherein said executing the first test executive sequence comprises executing the first step, wherein said executing the first step comprises asynchronously calling the second test executive sequence;
execute the second test executive sequence in response to said asynchronously calling the second test executive sequence, wherein the second test executive sequence executes asynchronously from the first test executive sequence.

33. The memory medium of claim 32,
wherein the plurality of steps in the first test executive sequence includes a first subset of steps before the first step and a second subset of steps after the first step;
wherein said executing the first test executive sequence comprises:
executing the first subset of steps;
executing the first step, wherein said executing the first step comprises asynchronously calling the second test executive sequence;
executing the second subset of steps without waiting for the second test executive sequence to execute.

34. The memory medium of claim 32,
wherein said including the plurality of steps in the first test executive sequence and said including the plurality of steps in the second test executive sequence are performed without receiving user input writing program code.

* * * * *

UNITED STATES PATENT AND TRADEMARK OFFICE
CERTIFICATE OF CORRECTION

PATENT NO. : 7,191,361 B2 Page 1 of 1
APPLICATION NO. : 09/944521
DATED : March 13, 2007
INVENTOR(S) : Grey et al.

It is certified that error appears in the above-identified patent and that said Letters Patent is hereby corrected as shown below:

Column 21 Line 49, please delete "a memory medium" and substitute --a memory medium; --;

Column 22 Line 26, please delete "steps include, a first step" and substitute -- steps include a first step --.

Signed and Sealed this

First Day of May, 2007

JON W. DUDAS
*Director of the United States Patent and Trademark Office*